US012634268B2

(12) United States Patent
Shipkovenski et al.

(10) Patent No.: US 12,634,268 B2
(45) Date of Patent: May 19, 2026

(54) FUNCTIONS AS A SERVICE

(71) Applicant: VMware LLC, Palo Alto, CA (US)

(72) Inventors: Miroslav Krasimirov Shipkovenski, Sofia (BG); Antonio Kristiyanov Filipov, Sofia (BG); Petya Georgieva Zhelyazkova, Sofia (BG); Vesela Staykova Popova, Karlovo (BG)

(73) Assignee: VMware LLC, Palo Alto, CA (US)

( * ) Notice: Subject to any disclaimer, the term of this patent is extended or adjusted under 35 U.S.C. 154(b) by 129 days.

(21) Appl. No.: 18/371,764

(22) Filed: Sep. 22, 2023

(65) Prior Publication Data

US 2025/0106193 A1 Mar. 27, 2025

(51) Int. Cl.
*H04L 9/40* (2022.01)
*G06F 8/36* (2018.01)
*G06F 9/54* (2006.01)

(52) U.S. Cl.
CPC ............... *H04L 63/08* (2013.01); *G06F 8/36* (2013.01); *G06F 9/547* (2013.01); *H04L 63/20* (2013.01)

(58) Field of Classification Search
CPC ......... H04L 63/08; H04L 63/20; H04L 63/10; G06F 8/36; G06F 9/547; G06F 2209/5015; G06F 9/5027; G06F 9/5072
USPC .......................................................... 726/1
See application file for complete search history.

(56) References Cited

U.S. PATENT DOCUMENTS

2021/0200527 A1    7/2021  Sanchez et al.
2021/0200596 A1*   7/2021  Sanchez ................ G06F 9/5038

OTHER PUBLICATIONS

Henderson, T. "An Introduction to Faas (Function as a Service)," Linode Docs, Feb. 11, 2021, pp. 1-7, URL: https://www.linode.com/docs/guides/introduction-to-function-as-a-service-faas/.
Sentinelone: "Function as a Service (FaaS) Explained," Jul. 16, 2021, pp. 1-12, URL: https://www.sentinelone.com/blog/function-as-a-service-faas/.
Extended European Search Report mailed Feb. 25, 2025 in European Patent Application No. 24196061.6, 12 pages.
Extended European Search Report mailed Feb. 25, 2025 in European Patent Application No. 24196065.7, 10 pages.

* cited by examiner

*Primary Examiner* — Aubrey H Wyszynski
(74) *Attorney, Agent, or Firm* — Kim & Stewart LLP

(57) ABSTRACT
Some embodiments of the invention provide a method of implementing a FaaS (functions as a service) framework executing in a first cloud for multiple applications operating on multiple machines in the first cloud. The method provides to the FaaS framework (1) multiple sets of credentials for accessing of multiple cloud providers and (2) a set of selection rules for selecting cloud providers from the multiple cloud providers to execute multiple functions for the multiple programs. For each particular function in the multiple functions, the method configures the FaaS framework to use the set of selection rules to select a particular cloud provider from the multiple cloud providers to execute the particular function, and configures the FaaS framework to use a particular set of credentials associated with the selected particular cloud provider from the multiple sets of credentials to forward the particular function to the selected particular cloud provider for execution.

20 Claims, 14 Drawing Sheets

```
400
def handler(context, inputs):
    # CLIENT CODE GOES HERE return inputs
```

```
500
function handler($context, $inputs) {
    # CLIENT CODE GOES HERE return inputs
}
```

```
>>> def handler(a, b):
...     c = a + b
...     return c
...
>>> handler (1, 2)
3
>>>
>>> def handler (a, b):
...     c = a * b
...     return c
...
>>> handler (4, 5)
20
>>>
```

700

```
import java.util.concurrent.Future;
import com.vmware.faas.Faas;
import com.vmware.faas.FunctionResult;
import com.vmware.faas.runtime.Runtime;

...

Future<FunctionResult> result = Faas.execute('~/multiply.py', Runtime.PYTHON);
```

*Figure 7*

FUNCTIONS AS A SERVICE

BACKGROUND

In the beginning, most applications followed a monolithic architecture. Virtualization helped to break those monoliths by moving towards microservice oriented architecture, which gained a lot of traction thanks to the popularization of software containers (e.g., Docker). The last step in that evolution is the concept of Functions as a Service (FaaS), a cloud computing platform, which allows customers to develop, run, and manage application functionalities without the complexity of building and maintaining the infrastructure typically associated with developing and launching an application.

Distributed computing has been a well-known field in computer science for decades. Breaking down a software into small parts which interact with each other has its benefits like location transparency, better performance, scalability of each part of the system, language agnostic implementation and so on. However, there are several disadvantages like communication issues (e.g., messages being lost or delayed, services crashing during the function call, is it safe to retry). As such, an alternative solution is provided to well-known implementations like RPC/RMI by providing a way to execute simple serverless functions, using REST and JSON for interaction with the function.

BRIEF SUMMARY

Some embodiments of the invention provide a method of providing functions as a service (FaaS). Functions are blocks of self-contained, organized, reusable code that are each used to perform a single, related action (i.e., a specific task). Functions can be any piece of code written in any programming language, and are cloud-agnostic such that after being written once, a function can be executed at any cloud that provides FaaS. Functions provide better modularity for applications and high degrees of code reusability. Each function takes in input values, processes the input values, and return a result.

At a FaaS framework executing in a first cloud, the method receives a first API (Application Programming Interface) call invoking a first function that is defined by the framework. At the FaaS framework, the method generates, from the first API call, a second API call that directs a set of machines in a second cloud to invoke a second function that performs a desired operation of the first function in the second cloud. The method forwards, at the FaaS framework, the second API call to the second cloud for the set of machines to instantiate the second function after receiving the second API call, to use the second function to perform the desired operation, and to discard the second function after performing the desired operation.

In some embodiments, after the second cloud uses the second function to perform the desired operation, the FaaS framework receives a result of said desired operation from the set of machines in the second cloud and provides the result to a source of the API call. The second cloud discards the second function after providing the result to the FaaS framework, according to some embodiments. The second API call of some embodiments includes executable code for the second function, and the set of machines instantiates the second function and uses the second function to perform the desired operation by executing the executable code.

The source of the API call, in some embodiments, is an application executing on a machine in the first cloud. In some embodiments, the method is performed by a software development kit (SDK) that is implemented on the machine along with the application in order to receive API calls regarding functions to execute for the application, and to provide the results of desired operations of the functions to the application. The FaaS framework of some embodiments is a distributed FaaS framework that stores multiple functions for multiple applications executing on multiple machines in the first cloud, and each application has an associated interface (e.g., SDK) through which to access the distributed FaaS framework. The functions stored by the FaaS framework are user-defined functions written in multiple programming languages (e.g., Java, C++, Python, etc.), in some embodiments, based on which programming language is best suited for the function (i.e., as determined by the user writing the function).

In some embodiments, the first API call is in a first format and the second API call is in a second format that is compatible with the second cloud. The first API call, in some embodiments, specifies a name of the first function to allow the FaaS framework to retrieve the first function (e.g., from a library of the FaaS framework), a particular programming language to be used at runtime of the first function, and a set of input values for the first function. In some embodiments, the second API call includes the second function as a set of executable code in the particular programming language that, when executed by the set of machines in the second cloud, performs the desired operation of the first function, as well as the set of input values, and a set of credentials that allow the FaaS framework to access the second cloud.

The second cloud, in some embodiments, is provided by a first cloud provider of multiple cloud providers, and the set of credentials included in the second API call is a first set of credentials of multiple sets of credentials stored by the FaaS framework and used by the FaaS framework to access the multiple cloud providers. In some embodiments, several sets of credentials can be associated with one cloud provider, with each particular set being further associated with a respective account held with the cloud provider. To generate the second API call, the FaaS framework of some embodiments first selects the first cloud provider from the multiple cloud providers, and uses the first set of credentials in generating the second API call.

In some embodiments, each set of credentials includes a set of key-value pairs. Each key-value pair, in some embodiments, includes at least an identifier of the particular cloud provider for which the set of key-value pairs grants access, and an account identifier that allows the FaaS framework to distinguish between different accounts held with the same cloud provider. In some embodiments, the key-value pairs include additional attributes that are specific to the cloud provider for which the key-value pairs are used to access. For example, to access a first cloud provider (e.g., AWS), the key-value pairs include a key and a secret, while to access a second cloud provider (e.g., Azure), the key-value pairs include a subscription identifier, a tenant identifier, an application identifier, and a secret key.

The multiple sets of credentials stored by the FaaS framework are provided to FaaS framework in a provider properties configuration file that includes sets of properties for the multiple cloud providers. In addition to the provider properties configuration file, the FaaS framework of some embodiments is also provided with a set of selection rules for selecting between the multiple cloud providers. In some embodiments, the FaaS framework first identifies which cloud providers support the programming language in which a particular function is written. When two or more cloud providers support the programming language, in some embodiments, the FaaS framework uses the set of selection rules to select between the identified cloud providers.

Examples of selection rules of some embodiments include selection rules that specify to select the cloud provider associated with performance metrics that most closely fall within a range defined by the selection rules, selection rules that specify to select the cloud provider associated with the lowest cost, selection rules that specify to select the cloud provider that is most geographically proximate to the FaaS framework, selection rules that specify to randomly select from the identified cloud providers, etc. In some embodiments, the selection rules are defined for individual functions or types of functions (e.g., selection rules defined for all addition functions regardless of programming language), and/or for different programming languages (e.g., functions written in C++ have different cloud provider selection rules than functions written in Python). In other embodiments, the selection rules are defined for other attributes (e.g., time of day to avoid high-traffic times for certain cloud providers).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 7 illustrates an example of an execute function utilized in some embodiments.

DETAILED DESCRIPTION

Figure 1:
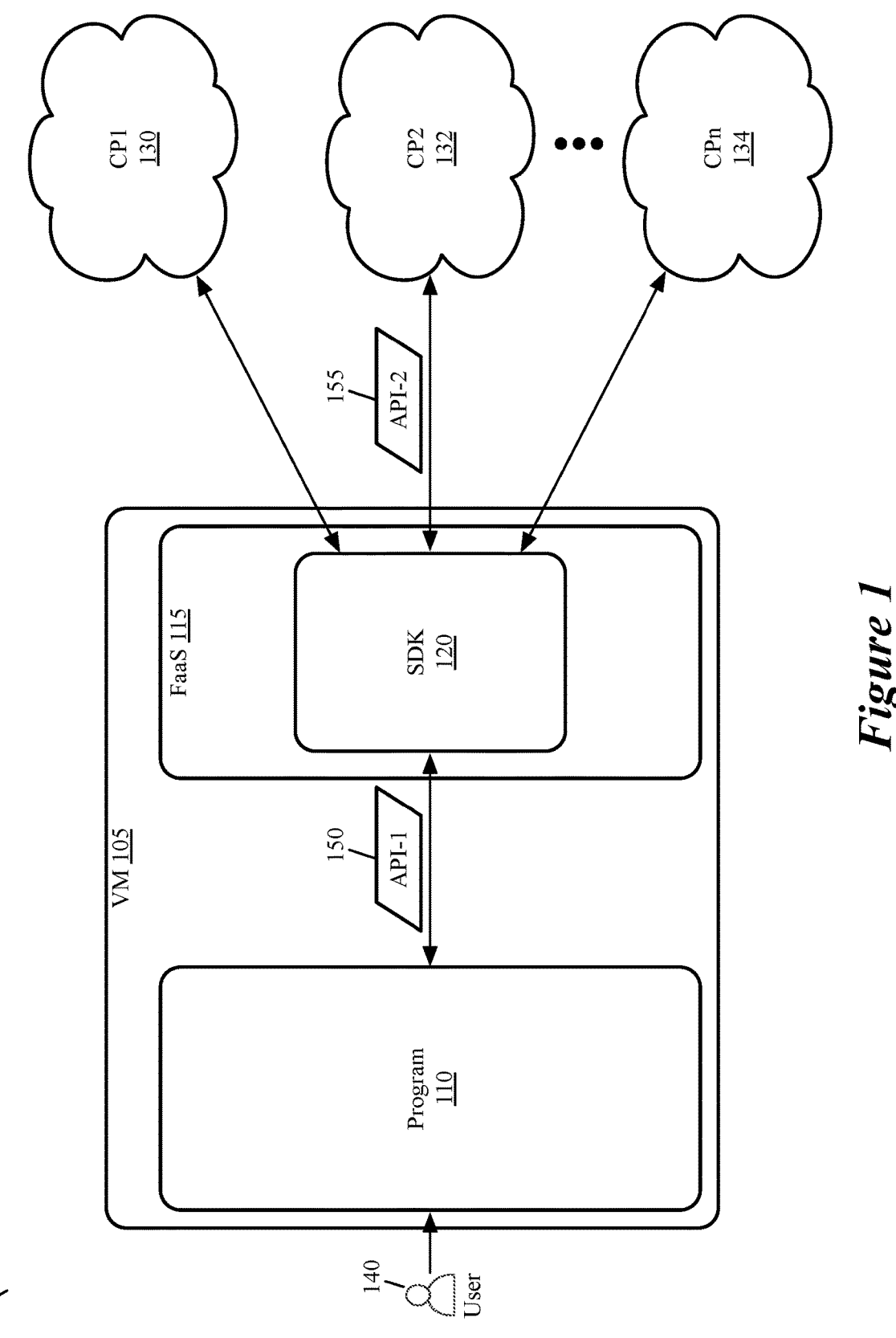
FIG. 1 conceptually illustrates a diagram that includes a VM on which the FaaS framework is implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of providing functions as a service (FaaS). At a FaaS framework executing in a first cloud, the method receives a first API (Application Programming Interface) call invoking a first function that is defined by the framework. Functions are blocks of self-contained, organized, reusable code that are each used to perform a single, related action (i.e., a specific task). Functions provide better modularity for applications and high degrees of code reusability. Each function takes in input values, processes the input values, and return a result. At the FaaS framework, the method generates, from the first API call, a second API call that directs a set of machines in a second cloud to invoke a second function that performs a desired operation of the first function in the second cloud. The method forwards, at the FaaS framework, the second API call to the second cloud for the set of machines to instantiate the second function after receiving the second API call, to use the second function to perform the desired operation, and to discard the second function after performing the desired operation.

In some embodiments, after the second cloud uses the second function to perform the desired operation, the FaaS framework receives a result of said desired operation from the set of machines in the second cloud and provides the result to a source of the API call. The second cloud discards the second function after providing the result to the FaaS framework, according to some embodiments. The second API call of some embodiments includes executable code for the second function, and the set of machines instantiates the second function and uses the second function to perform the desired operation by executing the executable code.

In some embodiments, the method is performed at the FaaS framework by a lightweight and flexible runtime engine interface that allows users to define small scriptable functions and configure them to be executed at every step of the program that is being developed. Unlike traditional procedural programming where programs are sequences of instructions that are written in a single programming language, FaaS provides a way for instructions (e.g., functions) to be written in different programming languages depending on the nature of the task, and to be executed on any cloud provider (i.e., so long as the cloud provider supports the programming language of the instructions). The programming interface acts as a façade that hides the complexity of manual function management. In some embodiments, the runtime engine is distributed as a software library or software development kit (SDK).

The SDK supports multiple function providers and language runtimes. The configuration of every provider is done by supplying a set of properties in a configuration file to the SDK. Each set of properties, in some embodiments, is a set of key-value pairs that serve as credentials for cloud accounts used by the SDK to deploy and run functions in corresponding cloud environments (e.g., provided by cloud providers that also correspond to the cloud accounts). Each set of configuration properties, in some embodiments, has unique period-delimited key values. For instance, the first part of each key value represents a cloud provider type (e.g., AWS Lambda (AWS), Azure Functions (Azure), Google Cloud Functions (GCP), etc.), while the second part of each key value represents a provider name (e.g., a random string which allows the SDK to distinguish between different cloud accounts on the same provider). The rest of each key is a provider-specific key value.

The source of the API call, in some embodiments, is a program or an application executing on a machine in the first cloud. In some embodiments, the SDK is implemented on the machine along with the application in order to receive API calls regarding functions to execute for the application, and to provide the results of desired operations of the functions to the application. The FaaS framework of some embodiments is a distributed FaaS framework that stores multiple functions for multiple applications executing on multiple machines in the first cloud, and each application has an associated interface (e.g., SDK) through which to access the distributed FaaS framework. The functions stored by the FaaS framework are user-defined functions written in multiple programming languages (e.g., Java, C++, Python, etc.), in some embodiments, based on which programming language is best suited for the function (i.e., as determined by the user writing the function).

Functions can be any piece of code written in any programming language, and are cloud-agnostic such that after being written once, a function can be executed at any cloud that provides FaaS. Accordingly, functions provide better modularity for applications and high degrees of code reusability. Each function takes in input values, processes the input values, and returns a result. The instantiation, invocation, and discarding of a function are performed by the SDK. Users of the SDK first load the function (i.e., instantiate the function), then perform their business logic (i.e., by invoking the function), and subsequently destroy the function (i.e., discard the function).

The SDK manages the APIs of different cloud providers and provides to the users a unified API for CRUD (create, read, update, and delete) operations of functions regardless of the chosen cloud provider. The cloud providers execute functions invoked by users via the SDK and provided by the SDK using the infrastructure of the cloud providers, the implementation of which depends upon and varies between different cloud providers. Examples of such infrastructure, in some embodiments, include pods, containers, and virtual machines. In other embodiments, one or more cloud providers have predefined functions for execution that the SDK can invoke in lieu of providing source code for the functions to the cloud providers for execution. In some such other embodiments, the SDK provides the input values it receives and a name of the predefined function to be invoked to the chosen cloud provider for the chosen cloud provider to use to execute the invoked predefined function.

FIG. 1 conceptually illustrates a diagram 100 that includes a VM on which the FaaS framework is implemented. As shown, the VM 105 includes a program 110, the FaaS 115, and an SDK 120. The VM 105 executes in virtualization software (e.g., a hypervisor) executed by a host computer, in some embodiments. The SDK 120 interfaces with the program 110 and invokes functions for the program 110 in selected cloud providers 130, 132, and 134 (e.g., via a network connection between the SDK and cloud providers, such as over the Internet). The functions invoked by the SDK 120 are user-defined functions, in some embodiments, that the SDK 120 invokes after receiving API calls 150 from the program 110. These API calls are initiated by a user 140 of the program 110, according to some embodiments.

In some embodiments, the API call 150 is a first API call, as illustrated. This first API call 150, in some embodiments, is in a first format defined for the SDK 120 and includes information regarding a function to be invoked by the SDK 120. The API call 150 includes information such as the name of the function to be invoked, a programming language in which executable code of the function is written, and a set of input values for the named function, in some embodiments. The name of the function included in the API call 150 allows the SDK 120 of the FaaS framework 115 to retrieve the function (e.g., source code of the function from a library of the FaaS framework).

Based on the API call 150 received from the program 110, the SDK 120 of some embodiments selects a cloud provider from the available cloud providers 130-134, and generates a second API call 155 to invoke the function named in the first API call 150. In some embodiments, the second API call 155 is in a second format that is compatible with the selected cloud provider. In some embodiments, the function named in the API call 150 is a first function, and the function retrieved by the SDK 120 is a second function that when executed, performs the same operation, and produces the same results, as the named first function.

In some embodiments, the SDK 120 selects between the cloud providers 130-134 based on which cloud providers support the programming language in which the function is written. When multiple cloud providers support the programming language, the SDK 120 of some embodiments uses additional criteria to select from the available cloud providers. In some embodiments, the additional criteria is defined in a set of selection rules provided to the FaaS framework 115 (e.g., when the FaaS framework is configured on the VM 105).

Examples of selection rules of some embodiments include selection rules that specify to select the cloud provider associated with performance metrics that most closely fall within a range defined by the selection rules, selection rules that specify to select the cloud provider associated with the lowest cost, selection rules that specify to select the cloud provider that is most geographically proximate to the FaaS framework, selection rules that specify to randomly select from the identified cloud providers, etc. In some embodiments, the selection rules are defined for individual functions or types of functions (e.g., selection rules defined for all addition functions regardless of programming language), and/or for different programming languages (e.g., functions written in C++ have different cloud provider selection rules than functions written in Python). In other embodiments, the selection rules are defined for other attributes (e.g., time of day to avoid high-traffic times for certain cloud providers).

In order to send the second API call to the selected cloud provider (e.g., over a network connection to the selected cloud provider), the SDK 120 includes a set of credentials associated with the selected cloud provider in the second API call 155. The FaaS framework 115 of some embodiments stores multiple sets of credentials for accessing multiple different cloud providers. Each set of credentials corresponds to a particular account held with a particular cloud provider, according to some embodiments.

For instance, in some embodiments, the FaaS framework 115 includes a first account with a first cloud provider that can be used to access the first cloud provider in a first region (e.g., "US West"), and a second account with the same first cloud provider that can be used to access the first cloud provider in a second region (e.g., "US East"). The multiple sets of credentials stored by the FaaS framework are provided, in some embodiments, to the FaaS framework in a provider properties configuration file that includes sets of properties that include the sets of credentials for the multiple cloud providers. The FaaS framework is provided with the provider properties configuration file at the time of configuration, according to some embodiments.

In some embodiments, each set of credentials includes a set of key-value pairs. Each key-value pair, in some embodiments, includes at least an identifier of the particular cloud provider for which the set of key-value pairs grants access, and an account identifier that allows the FaaS framework to distinguish between different accounts held with the same cloud provider. In some embodiments, the key-value pairs include additional attributes that are specific to the cloud provider for which the key-value pairs are used to access. For example, to access a first cloud provider (e.g., AWS), the key-value pairs include a key and a secret, while to access a second cloud provider (e.g., Azure), the key-value pairs include a subscription identifier, a tenant identifier, an application identifier, and a secret key.

Figure 2:
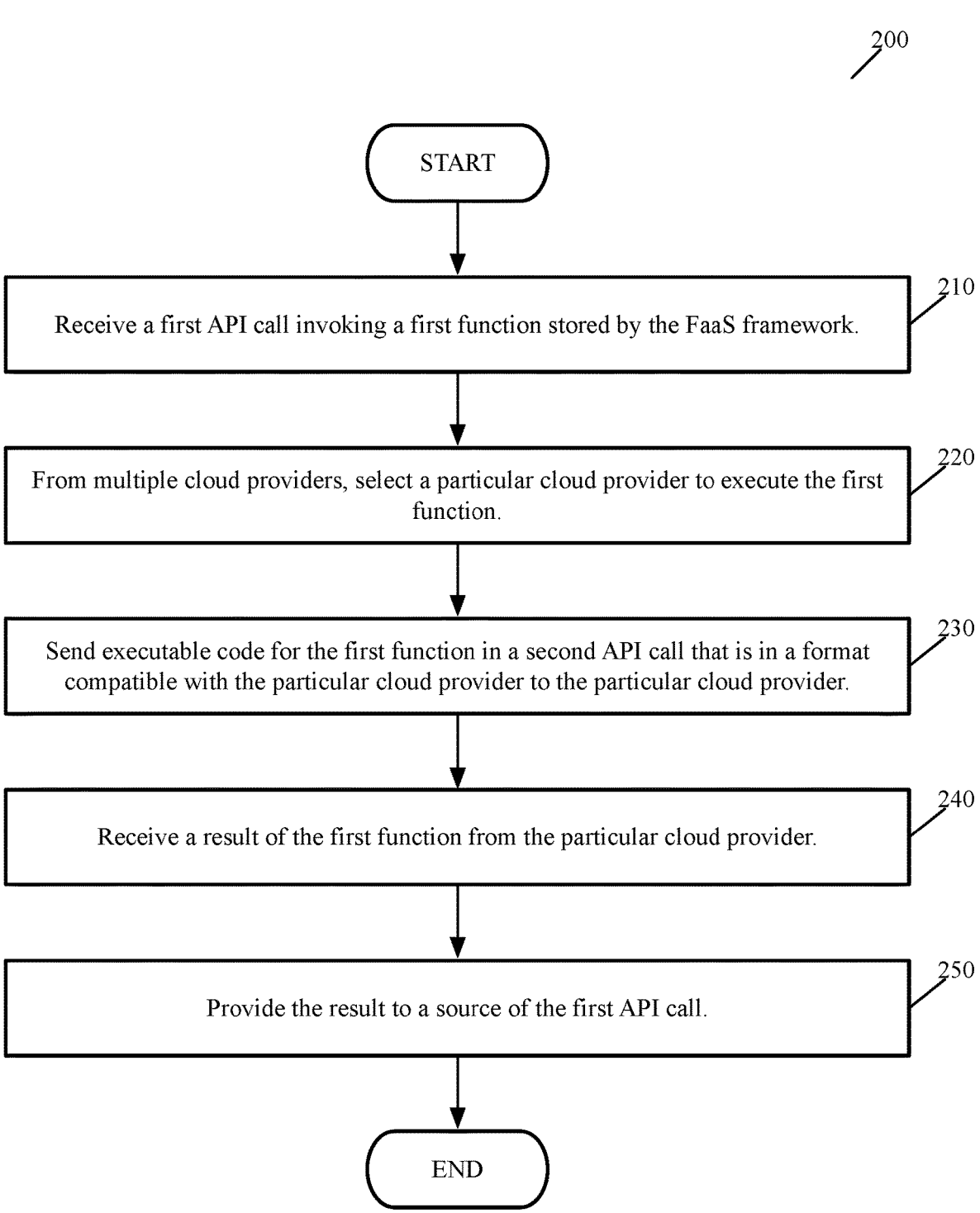
FIG. 2 illustrates a process performed by a FaaS framework (e.g., an SDK of the FaaS framework) in some embodiments to invoke a function for a particular program.

FIG. 2 illustrates a process 200 performed by a FaaS framework (e.g., an SDK of the FaaS framework) in some embodiments to invoke a function for a particular program. The process 200 will be described with references to the diagram 100. The process 200 starts when the FaaS framework receives (at 210) a first API call invoking a first function stored by the FaaS framework. In the diagram 100, for instance, the SDK 120 of the FaaS framework 115 receives the first API call 150 from the program 110 executing on the same VM 105 as the SDK 120 and FaaS framework 115.

The first API call, in some embodiments, specifies the name of the first function, a programming language to be used at runtime of the first function (e.g., the programming language in which executable code for the first function is written), and a set of input values for the named function. The FaaS framework of some embodiments stores source code files of multiple user-defined functions that are written in multiple different programming languages, and uses the name of the first function to identify a source code file of the first function for use in invoking the first function in a particular cloud provider.

From multiple cloud providers for which the FaaS framework holds credentials, the process 200 selects (at 220) a particular cloud provider to execute the first function. The FaaS framework 115 in the diagram 100, for example, selects between the cloud providers 130-134. In some embodiments, the first criterion used to select between the cloud providers is a compatibility criterion used to identify cloud providers that support the programming language in which the first function is written.

As also described above, the FaaS framework of some embodiments allows end users to choose to implement a function in any programming language of their liking, as long as the programming language is supported by at least one of the configured function providers (i.e., available cloud providers). For example, AWS Lambda natively supports programming languages such as Java, Go, PowerShell, Node.js, C #, Python, and Ruby.

When the FaaS framework identifies more than one cloud provider that support the programming language, the FaaS framework of some embodiments uses selection rules provided to the FaaS framework to select from the identified cloud providers. As described above, the selection rules of some embodiments are based on costs associated with the cloud providers, performance metrics associated with the cloud providers, proximity of the cloud providers relative to the location of the program for which the first function is to be executed, etc. In some embodiments, the selection rules specify to randomly select a cloud provider from the identified cloud providers.

After the FaaS framework has selected the particular cloud provider, the process 200 sends (at 230) executable code for the first function in a second API call that is in a format compatible with the particular cloud provider to the particular cloud provider. In some embodiments, the FaaS framework sends the second API call to the selected cloud provider via a network connection established over one or more links. The links of some embodiments include wired and wireless links, point-to-point links, broadcast links, multipoint links, point-to-multipoint links, public links, and private links (e.g., MPLS (multiprotocol label switching) links). The wired links of some embodiments can include, e.g., coaxial cables and fiber optic cables. The executable code included in the second API call is written in the programming language specified by the first API call, according to some embodiments. This code, in some embodiments, is the code from the source code file for the first function mentioned above. In addition to the function code, the second API call also includes the input values, and a set of credentials corresponding to the selected particular cloud provider. In some embodiments, as also described above, the set of credentials further correspond to a particular account held with the particular cloud provider (e.g., based on the region in which the cloud provider is being accessed).

Figure 3:
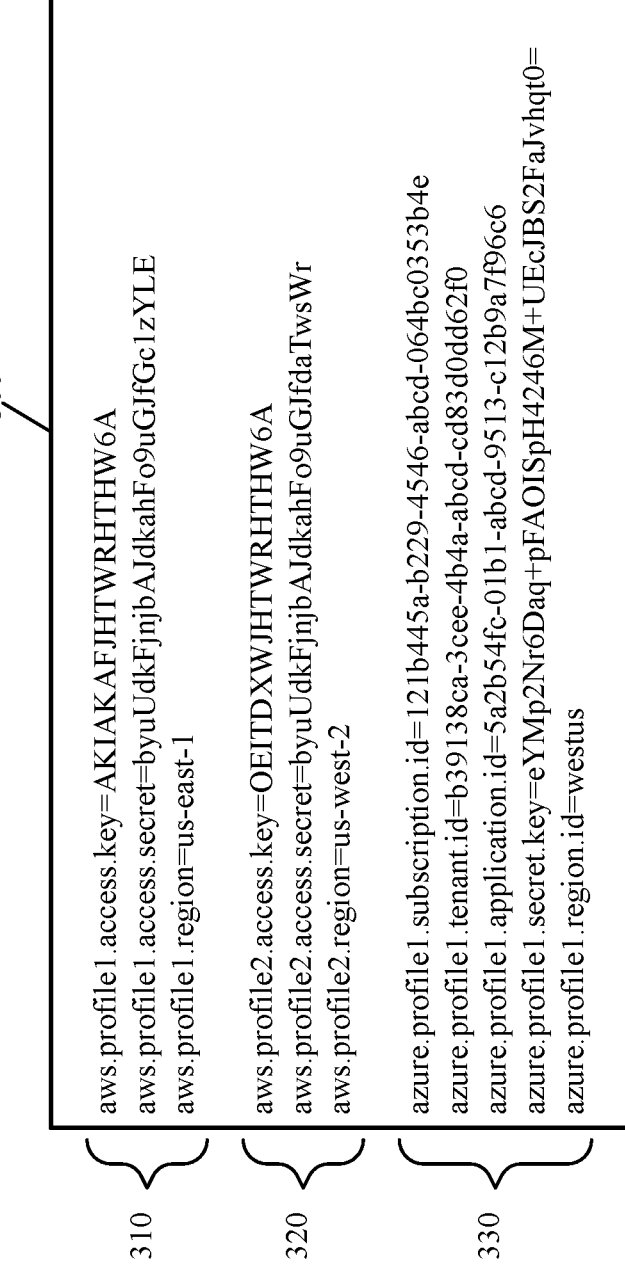
FIG. 3 illustrates an example of a portion of a provider properties configuration file of some embodiments that includes the credentials used to access the cloud providers.

FIG. 3 illustrates an example of a portion of a provider properties configuration file 300 of some embodiments that includes the credentials used to access the cloud providers. As shown, properties for three accounts associated with two different providers are included in this portion of the provider properties configuration file 300. The first account 310 and the second account 320 are with the same provider, AWS, as shown, while the third account 330 is with a second provider, Azure. For each account 310-330, a set of key-value pairs are provided.

The key-value pairs listed for each of the AWS accounts 310 and 320 include keys that begin with the name of the provider (i.e., "aws") followed by the name associated with the account (i.e., "profile1" and "profile2"). Each set includes an access key, an access secret, and a region. The values for the access keys and for the access secrets for the accounts 310 and 320 are string values, with each string value including a unique portion and a provider-specific portion (e.g., each access key ends with the string "JHTWRHTHW6A"). The account 310 is associated with region "us-east-1", and the account 320 is associated with the region "us-west-2".

For the third account 330, each key begins with the name of the cloud provider (e.g., "azure"), followed by the name associated with the account (e.g., "profile1"). The key-value pairs for account 330 include subscription identifier, tenant identifier, application identifier, secret key, and region identifier, as illustrated. The values in the key-value pairs for the account 330 are also string values. In generating the second API call 155 to the selected cloud provider, the SDK 120 uses the key-value pairs, such as those illustrated for any of the accounts 310-330, in the second API call 155 in order to access the selected cloud provider.

For instance, in the diagram 100, the SDK 120 of the FaaS framework 115 has selected the second cloud provider 132 to execute the function named in the first API call 150.

Accordingly, the SDK 120 sends the second API call 155 to the second cloud provider 132 for the second cloud provider 132 to execute the function. For example, in some embodiments, the function is a multiplication operation written using the programming language Python, and the particular cloud provider executes the function to perform the multiplication operation.

In some embodiments, the particular cloud provider executes the function by instantiating a new machine (e.g., VM, container, etc.) and instantiating the function on the new machine for execution. In other embodiments, the particular cloud provider uses an existing machine to execute the function. In some embodiments, after the function has been executed and a result has been produced, the particular cloud provider deconstructs and discards the function (e.g., destroys the function). In other embodiments, the particular cloud provider stores a copy of the function in a storage of the particular cloud provider and uses the stored copy to execute the function if it is invoked again. In these other embodiments, the particular cloud provider no longer requires subsequent API calls intended to invoke these stored functions to include the source code of such stored functions.

Returning to the process 200, the process 200 receives (at 240) a result of the first function from the particular cloud provider. For instance, using the multiplication operation function example described above, the result received by the FaaS framework would be a result of the multiplication operation (i.e., the numerical value resulting from multiplying provided input values). The particular cloud provider of some embodiments discards the function (e.g., deletes the source code) after providing the result to the FaaS framework, while in other embodiments, the particular cloud provider deconstructs the function (e.g., by deconstructing a machine used to execute the function), and stores a copy of the source code of the function for later use (e.g., if the function is again invoked at the particular cloud provider).

The process 200 then provides (at 250) the result to a source of the first API call. In the diagram 100, for instance, the SDK 120 of the FaaS framework 115 on the VM 105 provides function results to the program 110. In some embodiments, the SDK 120 provides the results to the program 110 as an API call to the program 110. Following 250, the process 200 ends.

By using FaaS, users in some embodiments avoid vendor lock-in as functions are executed on any supported cloud provider. Thus the only change made in some embodiments is to write a new function. Because functions can be written in different languages, as mentioned above, developers have more freedom and a wider variety of options for implementation. The FaaS framework handles all the work relating to function scaling.

Figures 4, 5:
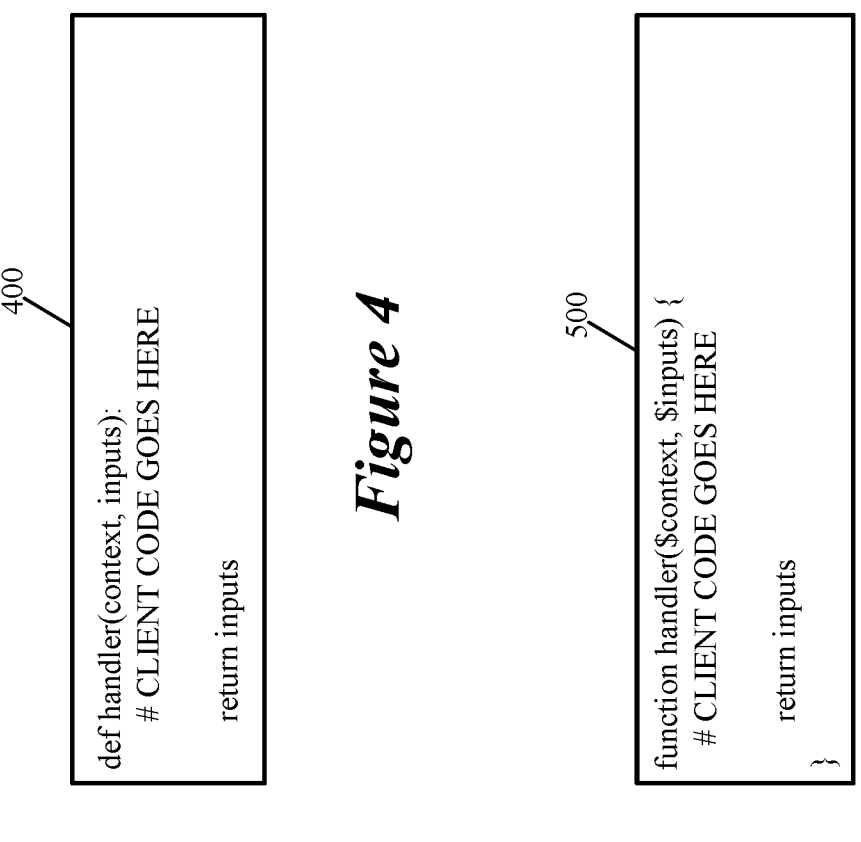
FIG. 4 illustrates an example of a shell of a handler function of some embodiments written in Python.
FIG. 5 illustrates an example of a shell of a handler function of some embodiments written in PowerShell.

In some embodiments, in order to enable the SDK to know how to invoke a function and collect its result, users are required to define a main handler function that receives a context and payload object regardless of the programming language used. FIG. 4 illustrates an example of a shell of a handler function 400 of some embodiments written in Python, while FIG. 5 illustrates an example of a shell of a handler function 500 of some embodiments written in PowerShell. Each of the handler functions 400 and 500 includes context, inputs, and the client code (e.g., source code). In some embodiments, the main handler functions are used for each function that a user desires to invoke (i.e., a one-to-one association between handler functions and functions to be invoked).

Figure 6:
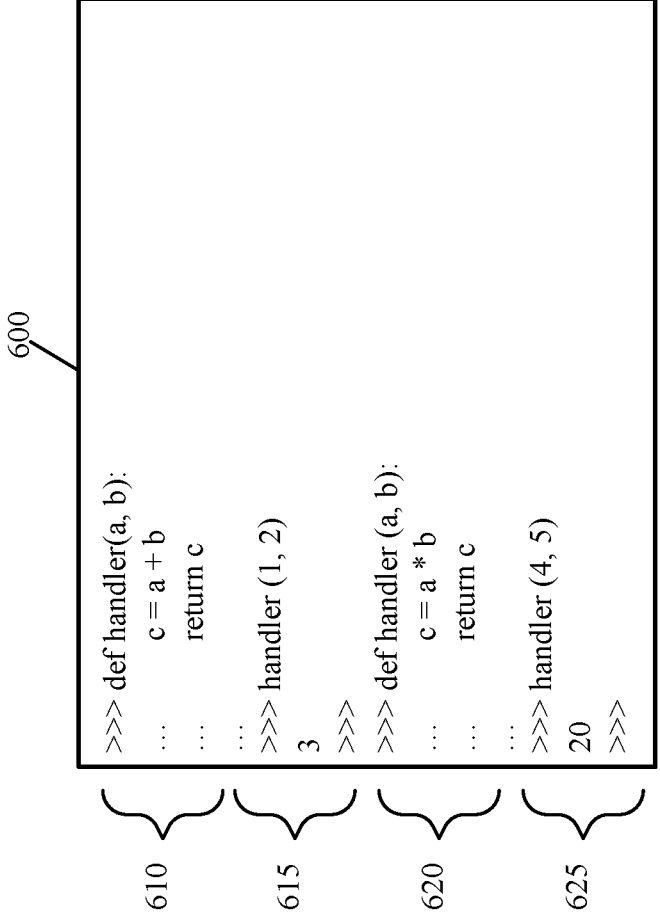
FIG. 6 illustrates an example of a set of handler functions and corresponding functions in Python.

FIG. 6 illustrates an example 600 of a set of handler functions and corresponding functions in Python. The example 600 includes a first handler function 610 that defines an addition operation "c=a+b", where "a" and "b" are input values and "c" is the result of the addition operation to be returned. As such, the corresponding function 615 specifies input values of (1, 2), resulting in a value of "3", as shown. The example 600 also includes a second handler function 620 that defines a multiplication operation "c=a*b", where "a" and "b" are input values and "c" is the result of the multiplication operation to be returned. The corresponding function 625 specifies input values of (4, 5), resulting in a value of "20" being returned.

While the example 600 includes two different functions, examples in which the same function is called multiple times as part of the same API call will include a handler function for each time the function is invoked, according to some embodiments. In other embodiments in which the same function is called multiple times as part of the same API call, the handler function is defined once and invoked multiple times within the same API call.

The function source code is stored in a source code file on a file system of the FaaS framework, in some embodiments. Each source code file includes a file extension that identifies the programming language in which the source code is written, according to some embodiments. In the case of Python, for instance, users in some embodiments define "add" and "multiply" operations in files called "add.py" and "multiply.py", respectively. The SDK of some embodiments hides the complexity of deploying and running function code from end users by providing a simple method to create and execute a function.

FIG. 7 illustrates an example of an execute function 700 utilized in some embodiments. As shown, the Faas.execute( ) function takes two parameters. The first is the location of source code file (e.g., ~/multiply.py), and the runtime programming language (e.g., "Runtime.PYTHON"). Based on these two parameters the SDK of some embodiments finds an appropriate cloud provider that supports the runtime programming language, creates an execution environment on the cloud, uploads the source code and runs it. In some embodiments, the cloud provider uses one or more existing machines to run the source code (e.g., inactive machines that have been previously instantiated, active machines, etc.). Alternatively, or conjunctively, the cloud provider of some embodiments instantiates (e.g., provisions and configures) one or more new machines to run the source code.

Figure 8:
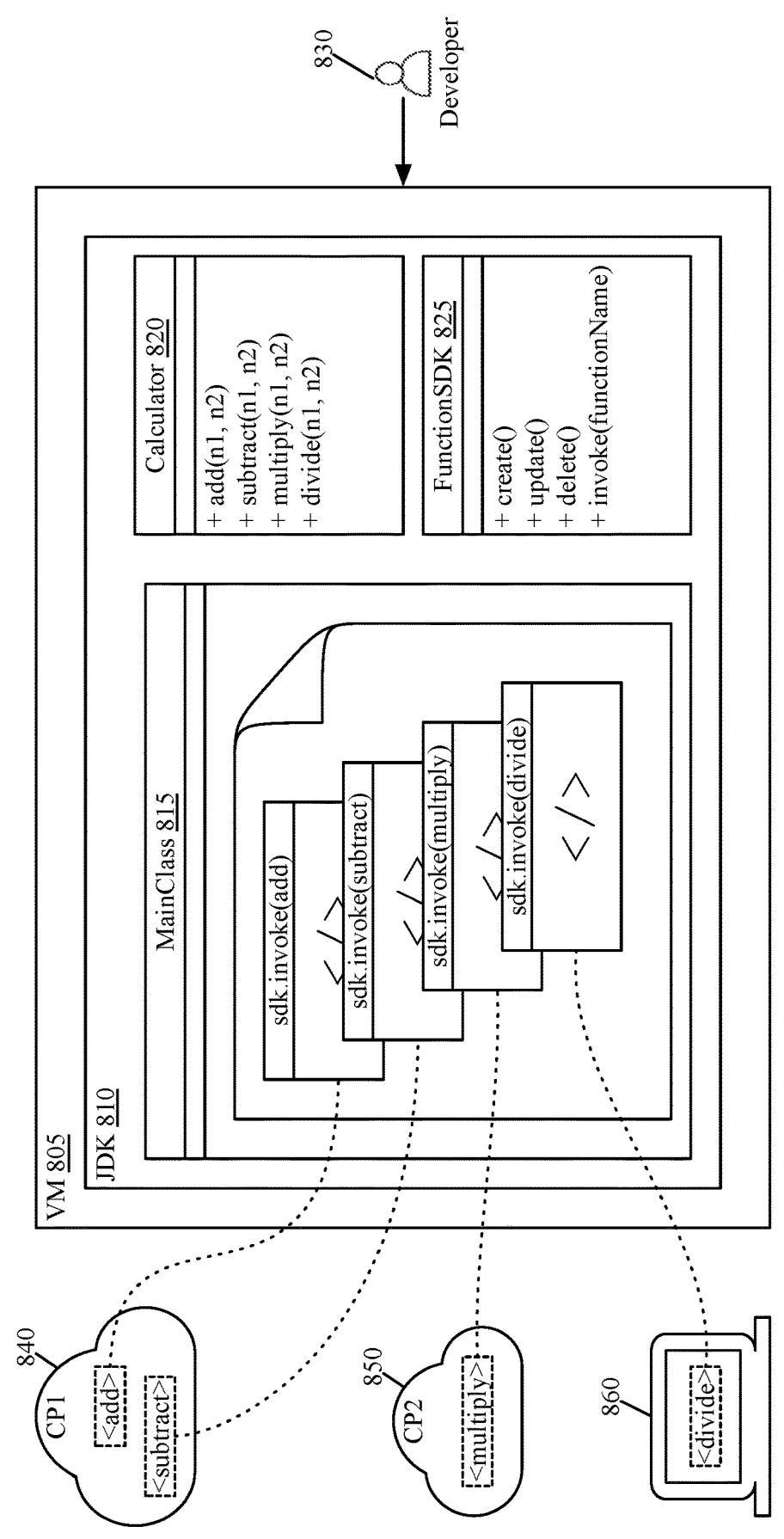
FIG. 8 conceptually illustrates a diagram in which an example of Java program, "Calculator", uses an SDK of a FaaS framework to execute functions, in some embodiments.

FIG. 8 conceptually illustrates a diagram 800 in which an example of Java program, "Calculator", uses an SDK of a FaaS framework to execute functions, in some embodiments. The diagram 800 includes a VM 805, a developer 830, a first cloud provider 840, a second cloud provider 850, and an on-premises host computer 860. In some embodiments, the VM 805 executes in virtualization software (e.g., a hypervisor) of a host computer. The VM 805 includes a Java Development Kit (JDK) 810 on which a main class 815, calculator program 820, and SDK 825 operate. For each function (e.g., add, subtract, multiply, and divide) of the calculator 820, a configuration is defined that allows these functions to run independently in a different environment.

The SDK 825 includes options to create a new function, update an existing function, delete an existing function, and invoke an existing function (e.g., by providing the function's name). The main class 815 includes all four functions of the calculator 820 being invoked (e.g., "sdk.invoke(add)", "sdk.invoke(subtract)", "sdk.invoke(multiply)", and "sdk.invoke(divide)"). These functions can be written in any programming language by the developer 830, as also described above. The SDK 825 identifies cloud providers, which can include the on-premises environment in which the VM 805 is operating, to execute the invoked functions.

In this example, the add and subtract functions are invoked in the cloud of the first cloud provider 840, while the multiply function is invoked in the cloud of the second cloud provider 850, and the divide function is invoked using an on-premises machine 860. Because of the nature of the FaaS framework, in some embodiments, there is no longer a restriction on using only one technology when developing these functions. In some embodiments, a programming language is chosen that best fits the purpose of this exact piece of functionality.

In some embodiments, when any of the functions of the calculator 820 is invoked and executed, the code (i.e., source code retrieved from the source code file defined and stored for the function) is transformed into hardware-compatible bytecode and, at the end, runs on the developer's machine. Some embodiments require that all of the codes be written in the same programming language.

Figure 9A:
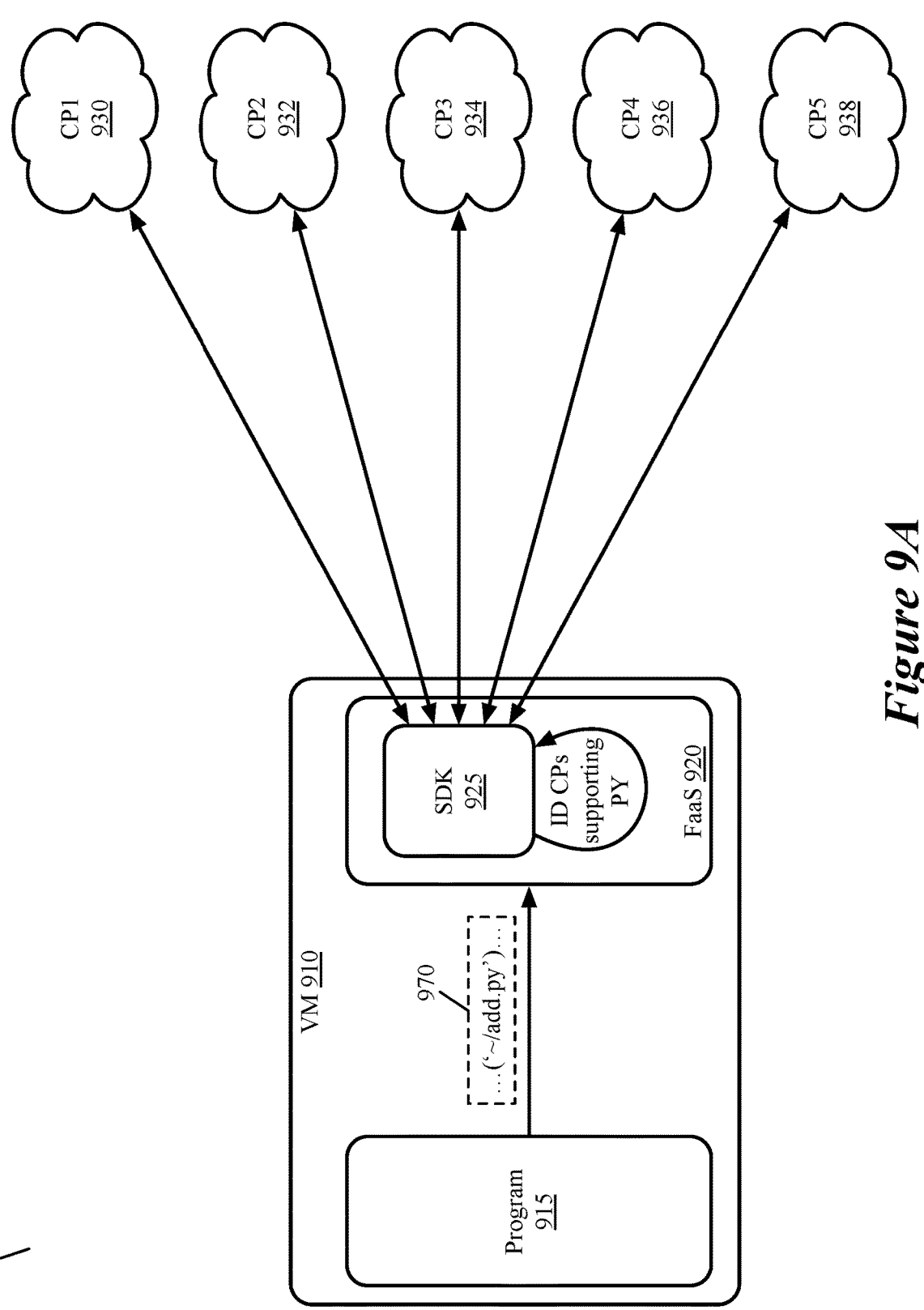
FIGS. 9A-9C conceptually illustrate a set of diagrams that show workflows of an SDK of a FaaS framework, in some embodiments.
Figure 9B:
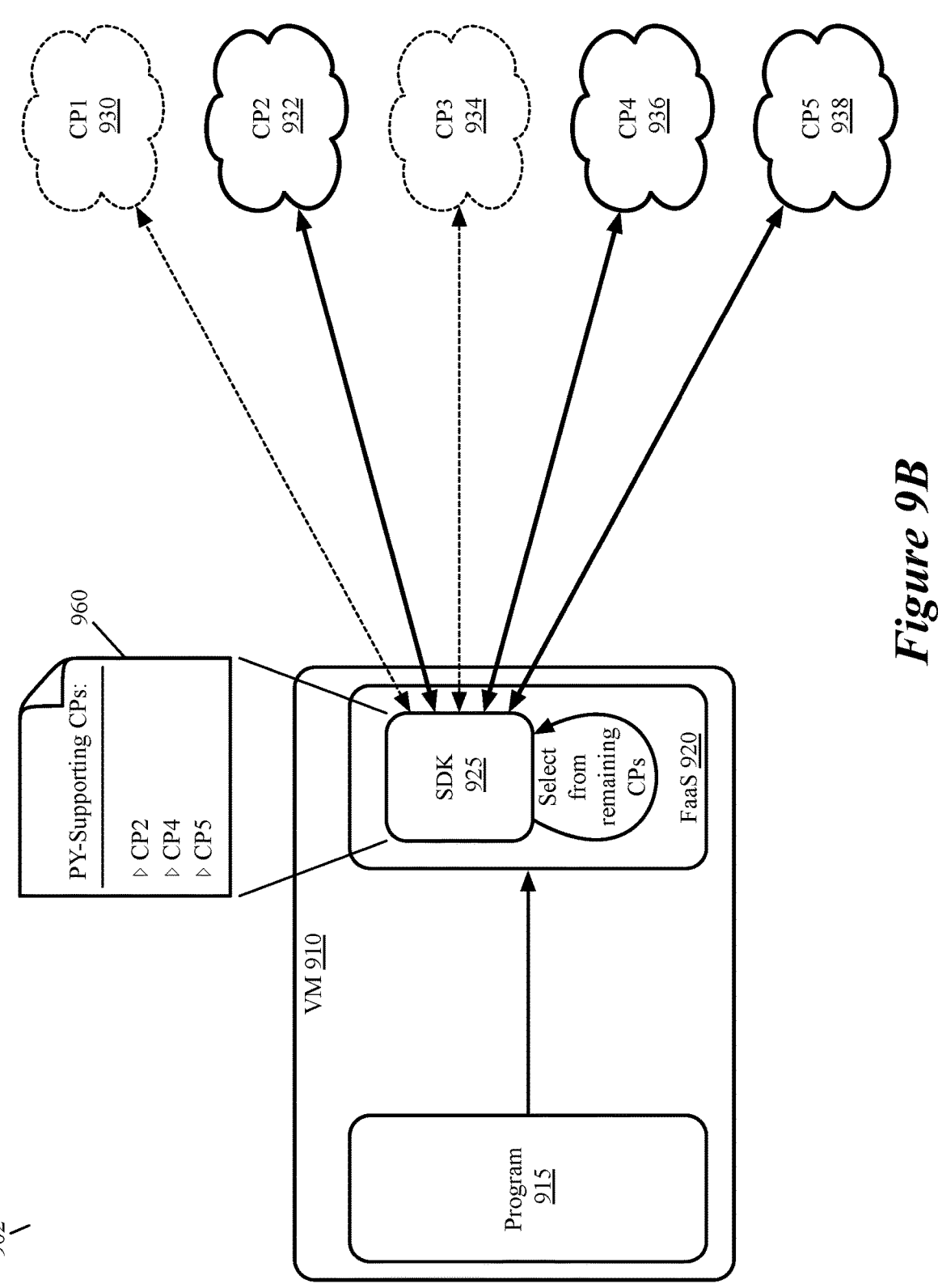
Figure 9C:
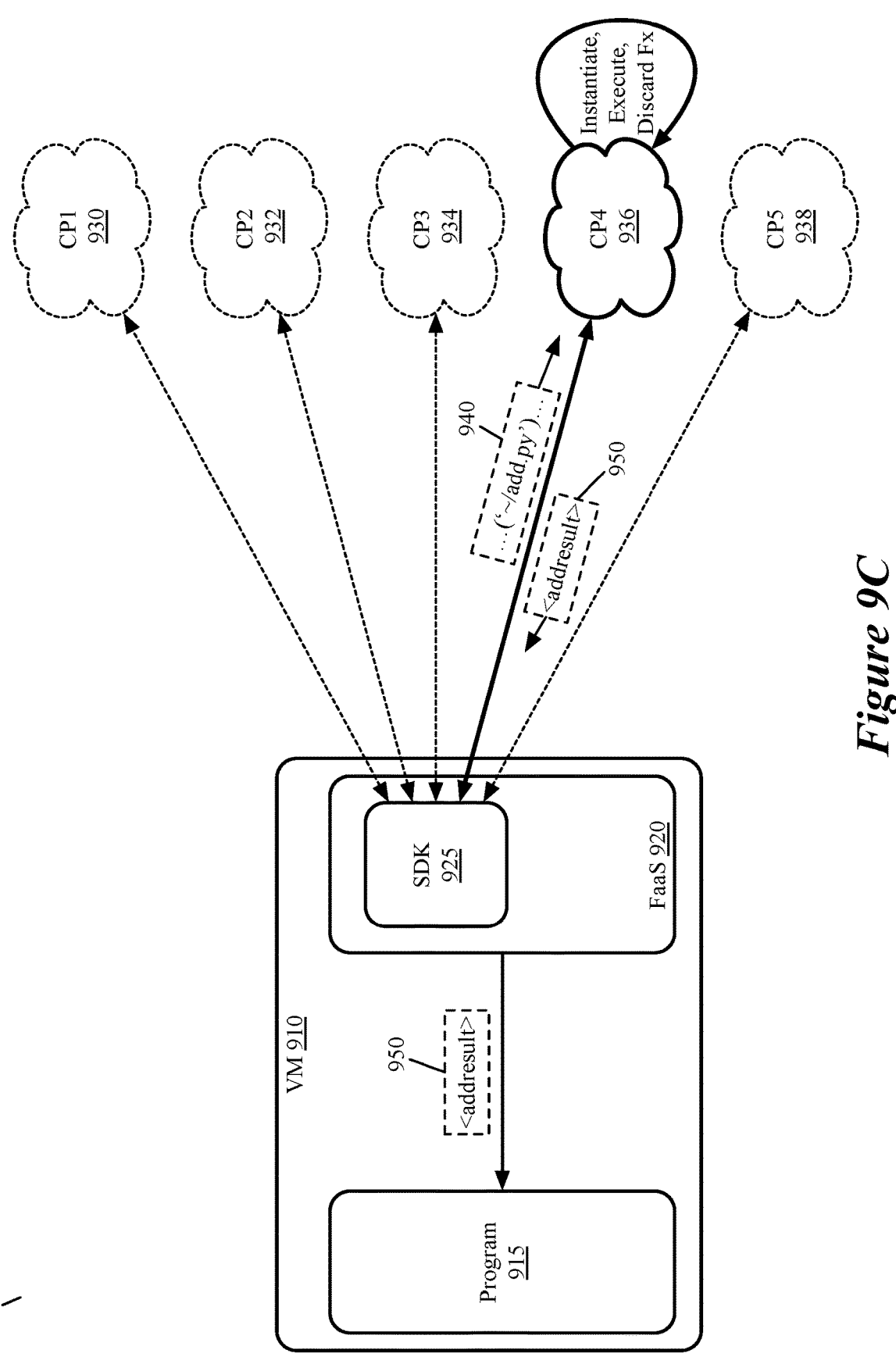

FIGS. 9A-9C conceptually illustrate a set of diagrams 901-903 that show workflows of an SDK of a FaaS framework, in some embodiments. As shown, the diagram 901 of FIG. 9A includes a VM 910 and multiple cloud providers 930, 932, 934, 936, and 938. While five cloud providers are shown in this example, other embodiments can include any number of cloud providers (e.g., more or less than five). The VM 910 includes a program 915, and an SDK 925 that is part of the FaaS framework 920. The VM 910 of some embodiments executes within virtualization software (e.g., a hypervisor) of a host computer. Initially, the program 915 sends a first API call 970 to the SDK 925 of the FaaS framework 920 to invoke a function named "add.py". The SDK 925 then identifies cloud providers that support the programming language of the function being invoked (i.e., Python).

Next, in the diagram 902 of FIG. 9B, a list of cloud providers 960 that support the programming language, Python, are identified, and the SDK 925 selects from these remaining cloud providers. As shown, the list 960 includes cloud providers 932 (CP2), 936 (CP4), and 938 (CP5). The cloud providers 930 (CP1) and 934 (CP3) that are not included in this list 960 and do not support the programming language are now illustrated in this diagram 902 with dashed outlines, while the cloud providers that do support the programming language are illustrated with bolded outlines to provide a visual representation of the available and unavailable cloud providers.

Finally, the diagram 903 of FIG. 9C shows that the SDK 925 has selected cloud provider 936 (CP4) as the cloud provider to execute the function specified in the first API call 970. As such, all unselected cloud providers 930 (CPI), 932 (CP2), 934 (CP3), and 938 (CPS) are now illustrated in this diagram 903 with dashed outlines, while the selected cloud provider 936 (CP4) still has a bolded outline to provide a visual representation of the selected versus unselected cloud providers. Based on the selection, the SDK 925 sends a second API call 940 with the source code of the function to be executed to the cloud provider 936, which instantiates, executes, and discards the function. The cloud provider 936 provides to the SDK 925 the result 950 of the operation for the executed function, which the SDK 925 then provides to the program 915 that is the source of the first API call 970.

Figure 10A:
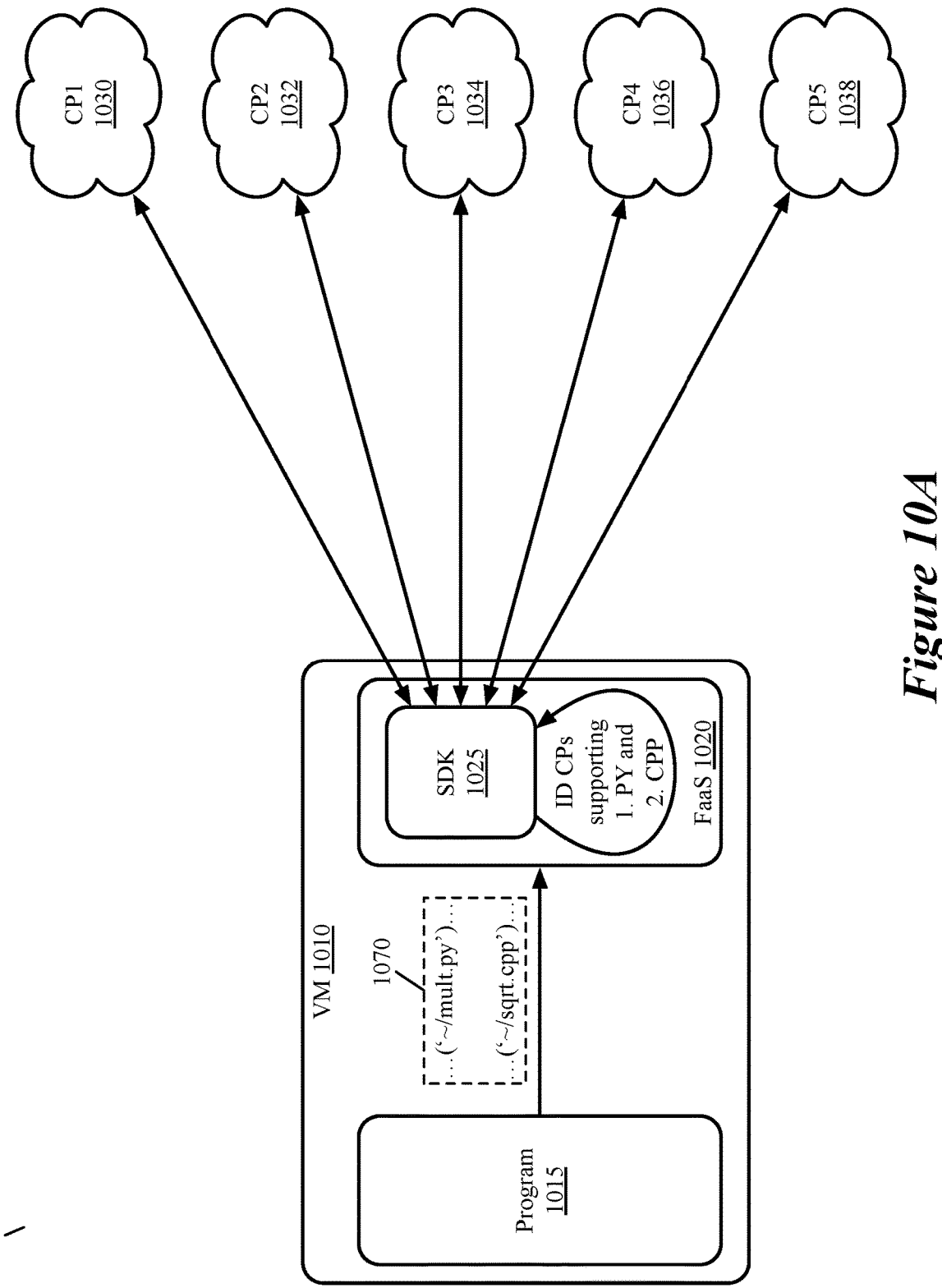
FIGS. 10A-10C conceptually illustrate a second set of diagrams that show workflows of an SDK of a FaaS framework of some embodiments when two functions are invoked in the same API call from a program.
Figure 10B:
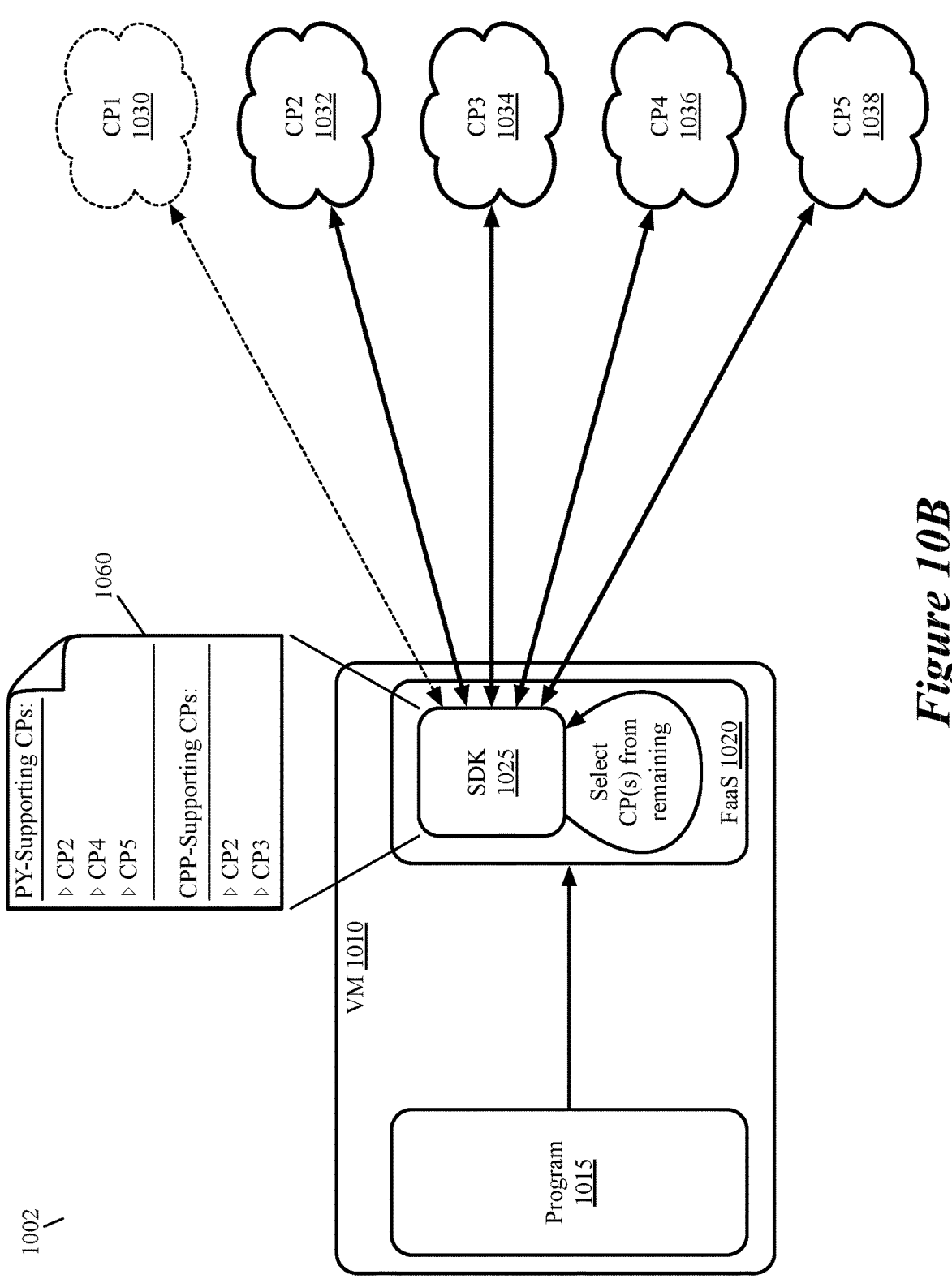
Figure 10C:
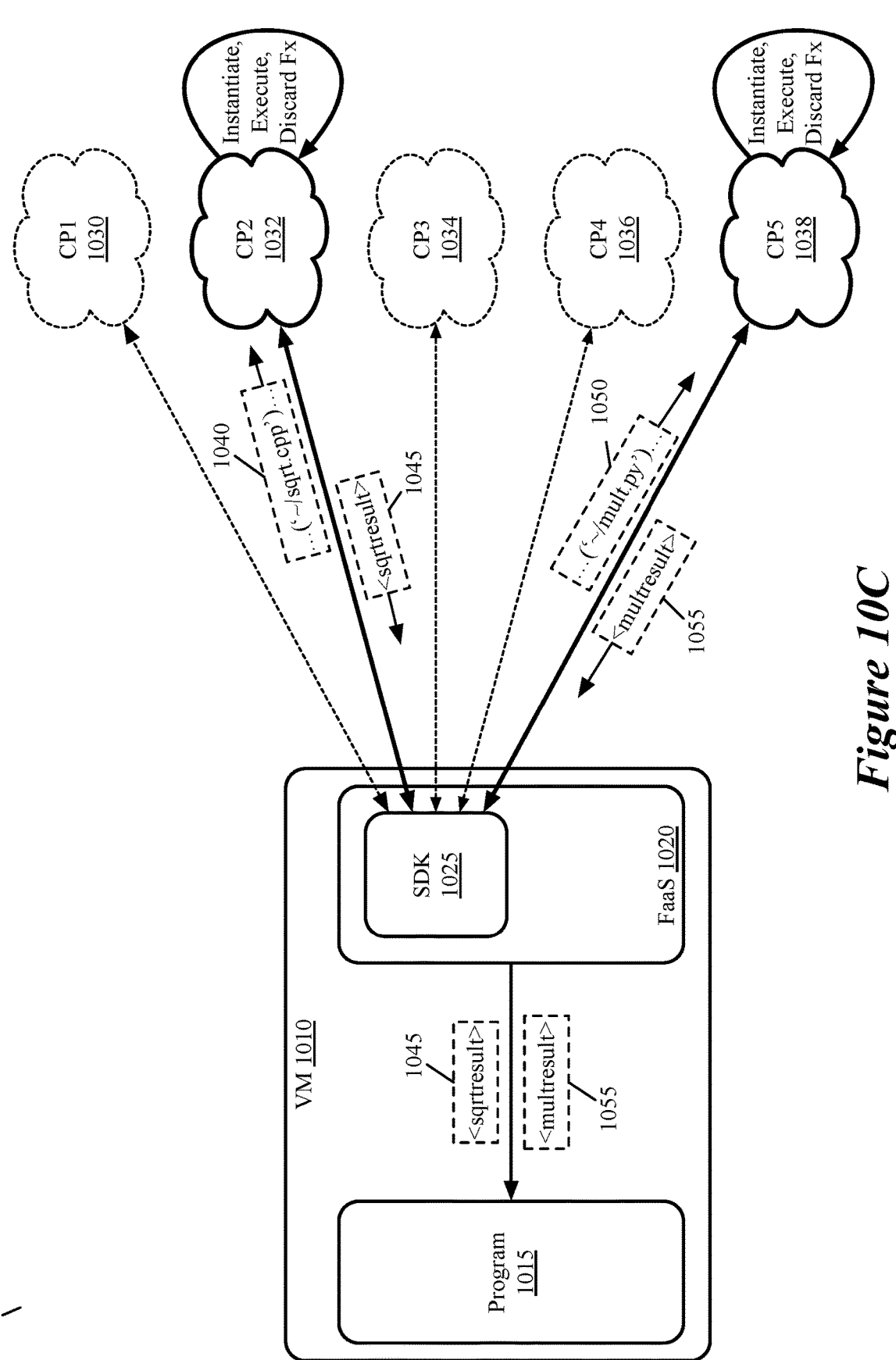

FIGS. 10A-10C conceptually illustrate a second set of diagrams 1001-1003 that show workflows of an SDK of a FaaS framework of some embodiments when two functions are invoked in the same API call from a program. Each of the diagrams 1001-1003 include a VM 1010 and multiple cloud providers 1030, 1032, 1034, 1036, and 1038, as shown. The VM 1010 includes a program 1015, FaaS framework 1020, and SDK 1025. In some embodiments, the VM 1010 executes within virtualization software (e.g., a hypervisor) of a host computer. In the diagram 1001 of FIG. 10A, the SDK 1025 of the FaaS 1020 receives a first API call 1070 that invokes two functions in two different programming languages (e.g., a multiplication function written in Python, and a square root function written in C++) from the program 1015. When the SDK 1025 receives the first API call 1070, the SDK 1025 identifies cloud providers that support Python, and identifies cloud providers that support C++.

In the diagram 1002 of FIG. 10B, the SDK 1025 has identified three (3) cloud providers that support Python (e.g., cloud providers 1032 (CP2), 1036 (CP4) and 1038 (CP5)), and two (2) cloud providers that support C++ (e.g., cloud providers 1032 (CP2) and 1034 (CP3)), as illustrated in the list 1060. Based on the identified cloud providers, the SDK 1025 selects a cloud provider to execute the multiplication function written in Python and a cloud provider to execute the square root function in C++. In some embodiments, the SDK 1025 selects the same cloud provider for the two functions when the cloud provider supports the programming language of both functions.

As described above, the SDK of some embodiments uses a set of selection rules to select from the identified functions. The selection rules can be based on cost, performance metrics, proximity, and/or other attributes as determined by a user, according to some embodiments. Also, in some embodiments, one or more of the selection rules specify for the SDK to randomly select from the identified cloud providers. Each cloud provider selection rule is defined for a particular programming language, and/or a particular set of functions, in some embodiments.

After the SDK 1025 has selected cloud providers for the functions, the SDK 1025 generates and sends API calls to the selected cloud providers for executing the functions. In the diagram 1003 of FIG. 10C, the SDK 1025 has selected cloud provider 1032 (CP2) to execute the square root function in C++ and sends an API call 1040 that includes the source code of the square root function, input values, and credentials for accessing the cloud provider 1032 (CP2). The SDK 1025 has also selected the cloud provider 1038 (CP5) to execute the multiplication function in Python and sends an API call 1050 that includes the source code of the multiplication function, input values, and credentials for accessing the cloud provider 1038 (CP5).

The cloud providers 1032 (CP2) and 1038 (CP5) instantiate and execute their respective functions, as shown, and discard these functions before or after sending the respective results 1045 and 1055 to the SDK 1025. In some embodiments, the cloud providers construct machines for executing the functions, and deconstruct the machines after the functions have been run. When the SDK 1025 receives the results 1045 and 1055, the SDK 1025 provides the results to the program 1015, as illustrated. While the workflows illustrated by FIGS. 10A-10C include two functions, the SDKs of some embodiments receive any number of functions from the programs with which they interface, and identify cloud providers for executing these functions.

Many of the above-described features and applications are implemented as software processes that are specified as a set of instructions recorded on a computer-readable storage medium (also referred to as computer-readable medium).

When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
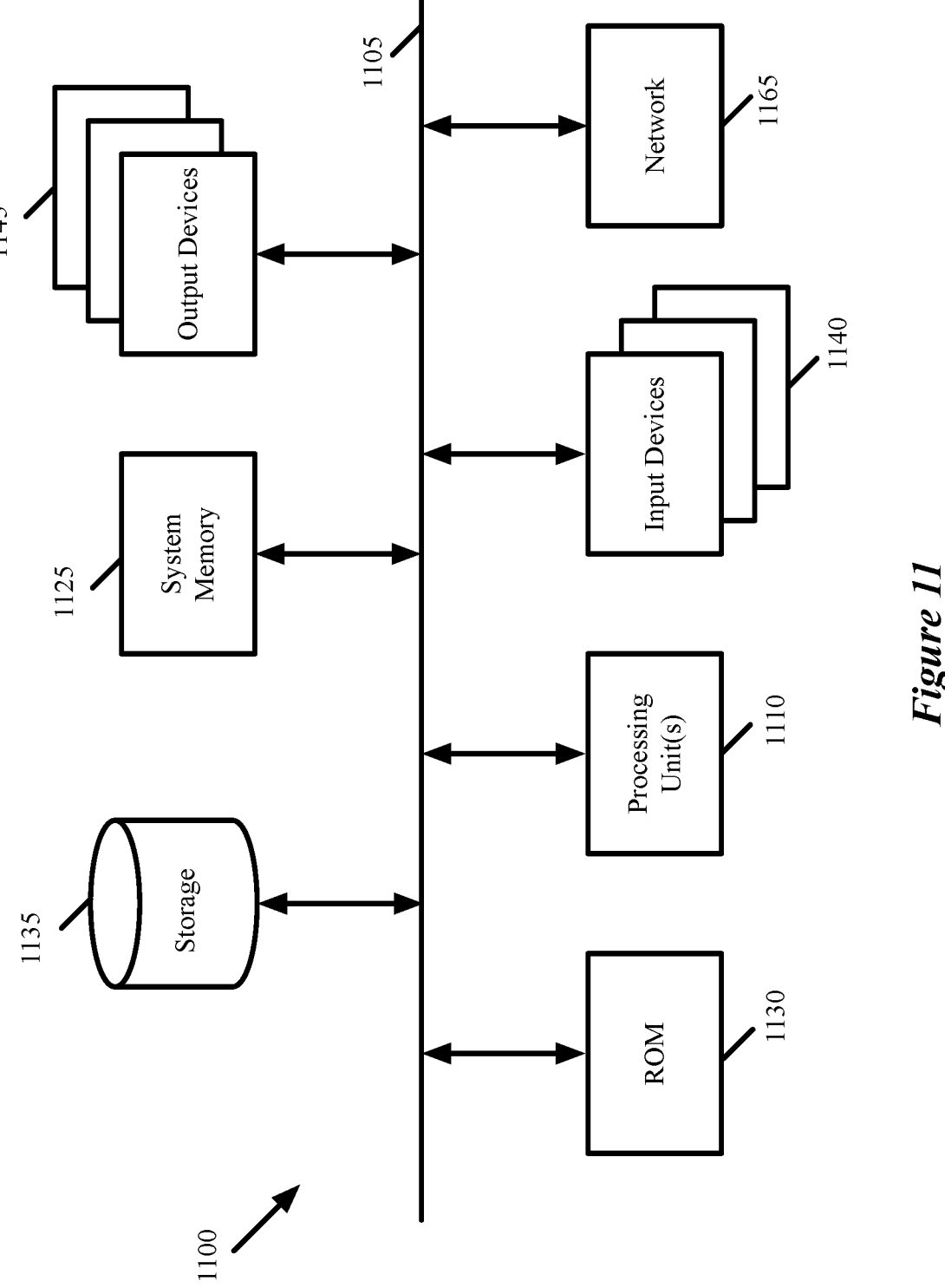
FIG. 11 conceptually illustrates a computer system with which some embodiments of the invention are implemented.

FIG. 11 conceptually illustrates a computer system 1100 with which some embodiments of the invention are implemented. The computer system 1100 can be used to implement any of the above-described hosts, controllers, gateway, and edge forwarding elements. As such, it can be used to execute any of the above described processes. This computer system 1100 includes various types of non-transitory machine-readable media and interfaces for various other types of machine-readable media. Computer system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the computer system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) 1110 may be a single processor or a multi-core processor in different embodiments. The read-only-memory (ROM) 1130 stores static data and instructions that are needed by the processing unit(s) 1110 and other modules of the computer system 1100. The permanent storage device 1135, on the other hand, is a read-and-write memory device. This device 1135 is a non-volatile memory unit that stores instructions and data even when the computer system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory 1125 is a volatile read-and-write memory, such as random access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices 1140 enable the user to communicate information and select commands to the computer system 1100. The input devices 1140 include alphanumeric keyboards and pointing devices (also called "cursor control devices"). The output devices 1145 display images generated by the computer system 1100. The output devices 1145 include printers and display devices, such as cathode ray tubes (CRT) or liquid crystal displays (LCD). Some embodiments include devices such as touchscreens that function as both input and output devices 1140 and 1145.

Finally, as shown in FIG. 11, bus 1105 also couples computer system 1100 to a network 1165 through a network adapter (not shown). In this manner, the computer 1100 can be a part of a network of computers (such as a local area network ("LAN"), a wide area network ("WAN"), or an Intranet), or a network of networks (such as the Internet). Any or all components of computer system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of implementing a FaaS (functions as a service) framework executing on one or more machines in a cloud environment to orchestrate the execution of functions requested by a plurality of applications, the method comprising:

providing to the FaaS framework (i) a plurality of sets of credentials for accessing a plurality of cloud providers and (ii) a set of selection rules for selecting cloud providers from the plurality of cloud providers to execute the requested functions; and configuring the FaaS framework to perform the following steps for each particular function in the requested functions:

use the set of selection rules to select a particular cloud provider from the plurality of cloud providers to execute the particular function; and transmit to the selected particular cloud provider (i) a particular set of credentials identifying a subscription or tenant of the selected particular cloud provider and (ii) the particular function for execution within the identified subscription or tenant, wherein for a first function in the requested functions, the FaaS framework transmits a first set of credentials and the first function to a first cloud provider in the plurality of cloud providers, wherein for a second function in the requested functions, the FaaS framework transmits a second set of credentials and the second function to the first cloud provider, and wherein the first and second sets of credentials identify different subscriptions or tenants of the first cloud provider.

2. The method of claim 1, wherein each set of credentials in the plurality of sets of credentials comprises a set of key-value pairs.

3. The method of claim 2, wherein each key-value pair in each set of key-value pairs comprises at least (i) an identifier of a particular cloud provider that the set of key-value pairs provides access to, and (ii) an account identifier associated with the particular cloud provider that the set of key-value pairs provides access to.

4. The method of claim 1, wherein the plurality of sets of credentials comprises at least the first and second sets of credentials associated with the first cloud provider, the first set of credentials being associated with a first account of the first cloud provider, and the second set of credentials being associated with a second account of the first cloud provider.

5. The method of claim 4, wherein the set of selection rules comprises a particular selection rule that specifies for the first cloud provider to execute functions associated with a first particular attribute using the first account, and for the first cloud provider to execute functions associated with a second particular attribute using the second account.

6. The method of claim 5, wherein the first particular attribute comprises a first programming language for executing the functions associated with the first particular attribute, and the second particular attribute comprises a second programming language for executing the functions associated with the second particular attribute.

7. The method of claim 3, wherein each key-value pair in each set of key-value pairs further comprises one or more attributes corresponding to the particular cloud provider that the set of key-value pairs provides access to.

8. The method of claim 1, wherein the set of selection rules comprises a compatibility rule specifying that if one or more of the requested functions are written in a particular programming language, to select a particular cloud provider that supports the particular programming language.

9. The method of claim 8, wherein the set of selection rules further comprises a particular selection rule that specifies logic for selecting between a set of cloud providers that each support the particular programming language.

10. The method of claim 9, wherein the particular selection rule specifies to select a cloud provider having a lowest associated cost among the set of cloud providers.

11. The method of claim 9, wherein the particular selection rule specifies to select a cloud provider associated with a performance metric that is within a particular range specified by the particular selection rule.

12. The method of claim 9, wherein the particular selection rule specifies to select a cloud provider that is most geographically proximate to the cloud environment among the set of cloud providers.

13. The method of claim 9, wherein the particular selection rule specifies to randomly select a cloud provider from the set of cloud providers.

14. A non-transitory machine readable medium storing a program executable by one or more processing units, wherein the program when executed causes the one or more processing units to perform the following steps for implementing a FaaS (functions as a service) framework executing on one or more machines in a cloud environment to orchestrate the execution of functions requested by a plurality of applications:

providing to the FaaS framework (i) a plurality of sets of credentials for accessing a plurality of cloud providers and (ii) a set of selection rules for selecting cloud providers from the plurality of cloud providers to execute the requested functions; and configuring the FaaS framework to perform the following steps for each particular function in the requested functions:

use the set of selection rules to select a particular cloud provider from the plurality of cloud providers to execute the particular function; and transmit to the selected particular cloud provider (i) a particular set of credentials identifying a subscription or tenant of the selected particular cloud provider and (ii) the particular function for execution within the identified subscription or tenant, wherein for a first function in the requested functions, the FaaS framework transmits a first set of credentials and the first function to a first cloud provider in the plurality of cloud providers, wherein for a second function in the requested functions, the FaaS framework transmits a second set of credentials and the second function to the first cloud provider, and wherein the first and second sets of credentials identify different subscriptions or tenants of the first cloud provider.

15. The non-transitory machine readable medium of claim 14, wherein each set of credentials in the plurality of sets of credentials comprises a set of key-value pairs.

16. The non-transitory machine readable medium of claim 15, wherein each key-value pair in each set of key-value pairs comprises at least (i) an identifier of a particular cloud provider that the set of key-value pairs provides access to, and (ii) an account identifier associated with the particular cloud provider that the set of key-value pairs provides access to.

17. The non-transitory machine readable medium of claim 14, wherein the plurality of sets of credentials comprises at least the first and second sets of credentials associated with the first cloud provider, the first set of credentials being associated with a first account of the first cloud provider, and the second set of credentials being associated with a second account of the first cloud provider.

18. The non-transitory machine readable medium of claim 17, wherein the set of selection rules comprises a particular selection rule that specifies for the first cloud provider to execute functions associated with a first particular attribute using the first account, and for the first cloud provider to execute functions associated with a second particular attribute using the second account.

19. The non-transitory machine readable medium of claim 18, wherein the first particular attribute comprises a first programming language for executing the functions associated with the first particular attribute, and the second particular attribute comprises a second programming language for executing the functions associated with the second particular attribute.

20. The non-transitory machine readable medium of claim 16, wherein each key-value pair in each set of key-value pairs further comprises one or more attributes corresponding to the particular cloud provider that the set of key-value pairs provides access to.

\* \* \* \* \*